US00RE34570E

United States Patent [19]

Fromkin

[11] E Patent Number: Re. 34,570

[45] Reissued Date of Patent: Mar. 29, 1994

[54] SHOE CUBBIES

[76] Inventor: Cyrus J. Fromkin, 7 Butternut Ct., Dix Hills, N.Y. 11746

[21] Appl. No.: 87,871

[22] Filed: Jul. 9, 1993

Related U.S. Patent Documents

Reissue of:

[64] Patent No.: 5,170,892
Issued: Dec. 15, 1992
Appl. No.: 840,406
Filed: Feb. 24, 1992

[51] Int. Cl.[5] ..... A47F 7/00
[52] U.S. Cl. ..... 211/36; 211/184
[58] Field of Search ..... 211/36, 34, 189, 184

[56] References Cited

U.S. PATENT DOCUMENTS

| | | | |
|---|---|---|---|
| 1,823,285 | 9/1931 | Petritsch | 211/184 X |
| 2,536,059 | 1/1951 | Igler | 211/36 X |
| 2,797,819 | 7/1957 | Lowmaster | 211/184 X |
| 4,611,717 | 9/1986 | Hatson | 211/34 |
| 4,917,429 | 4/1990 | Giger | 211/184 X |

*Primary Examiner*—David A. Scherbel
*Assistant Examiner*—Sarah A. Lechok
*Attorney, Agent, or Firm*—Galgano & Burke

[57] ABSTRACT

A cabinet for the storage of shoes and the like comprising a plurality of spaced, vertical dividers slit at spaced intervals at the front, each slit extending part of the way back from the front of the cabinet to about half the dept of the vertical dividers. Spaced, horizontal dividers are slit at spaced intervals at the rear of the cabinet, each slit extending part of the way from the back of the cabinet, the vertical and horizontal dividers being interleaved with each other so that the slits in the horizontal dividers accommodate the vertical dividers and the slits in the vertical dividers accommodate the horizontal dividers forming vertical columns and horizontal rows of cubby holes for the shoes. The forward edges of the vertical dividers extend forward of the front edges of the horizontal dividers. Channels on the front edges of the vertical dividers and holders are mounted on each of the horizontal walls adjacent the front of the cabinet to prevent side movement of the front edges of the vertical dividers.

8 Claims, 3 Drawing Sheets

SHOE CUBBIES

Matter enclosed in heavy brackets [ ] appears in the original patent but forms no part of this reissue specification; matter printed in italics indicates the additions made by reissue.

BACKGROUND INVENTION

The present invention relates to a storage rack for shoes and more particularly to a shoe storage rack which more efficiently and conveniently store shoes within a closet.

Racks for shoes currently available generally are bulky and tend to use the space within a closet wastefully and inefficiently.

During the past few years a new industry has developed which is devoted to the creation of cabinetry and equipment to maximize the use of space within small areas such as closets. People tend to accumulate articles of clothing including shoes as styles change and the amount of closet space available within homes and apartments has not kept pace with the growth and accumulation of clothing by the buying public.

In addition, the typical closet is provided with a shelf above eye level and a rod underneath to support hangers on which the articles of clothing are placed. When such a closet is filled it will generally be noted that the contents are poorly organized so that the space is used inefficiently. Sometimes cabinets are added to accommodate non-hanging articles such as shoes, sweaters, etc., and such cabinets are generally bulky and tend to occupy the closet space inefficiently.

A number of U.S. patents shows the types of cabinets or racks currently available for storing or displaying shoes.

U.S. Pat. No. 870,993 discloses a shoe rack with protectors for the shoes.

U.S. Pat. No. 904,755 illustrates a rack for moving shoes with provision to prevent the shoes from rubbing against each other.

U.S. Pat. No. 1,523,780 describes a display cabinet with adjustable shelves for showing shoes.

U.S. Pat. No. 2,536,059 discloses a rack for storing and suspending certain articles such as ties and shoes.

U.S. Pat. No. 3,552,576 relates to a unit for displaying shoes which incorporates a storage compartment for the shoe matching the one on display.

U.S. Pat. No. 3,788, 241 illustrates a modular shoe rack made up of identical panels for assembling a shoe rack of any capacity desired.

U.S. Pat. No. 4,219,248 shows a display unit for shoes and the like which comprises storage units which can individually be swung about.

U.S. Pat. No. 4,611,717 discloses a display case with an improved construction involving shelves and brackets.

None of the above patents teaches the present invention.

SUMMARY OF THE INVENTION

In this invention many of the problems associated with cabinets used for storing shoes are overcome or substantially reduced by providing a cabinet which is simple and economic in construction and yet uses the available space efficiently while at the same time not sacrificing convenience for the user.

A preferred embodiment of this invention comprises a cabinet for the storage of shoes and the like having a vertical and horizontal dividers which are interleaved with each other to form rows and columns of cubby holes for the shoes. The vertical dividers are slit in the front and the horizontal dividers are slit in the back to provide the interleaving. The horizontal dividers are provided with members in the front of the cabinet to prevent the fronts of the vertical dividers from moving side to side.

One of the features of the invention is that all of horizontal dividers and all of the vertical dividers in the manner described can be made identical with each other to permit the cabinet to be assembled economically and readily. In addition, the construction does not require any expensive joints or any skill to assemble in place.

It is thus a principal object of this invention to provide an improved cabinet for the storage and display of shoes.

Other objects and advantages of this invention will hereinafter become obvious from the following description of preferred embodiments of this invention.

DESCRIPTION OF THE PREFERRED EMBODIMENTS

Figure 1:
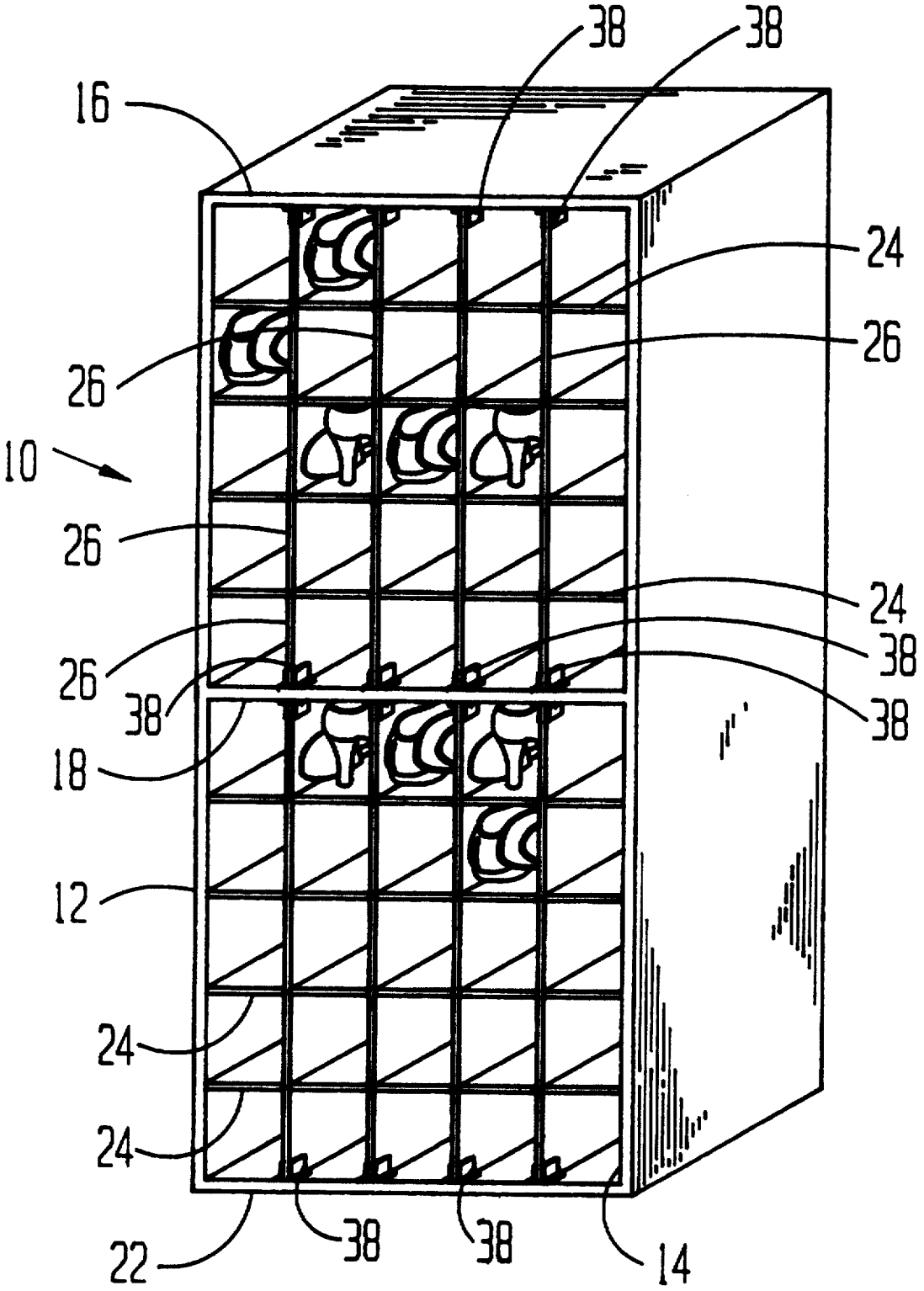
FIG. 1 is an isometric and illustrative view of a preferred embodiment of this invention.

Referring to FIG. 1, there is illustrated a storage cabinet 10 for shoes which incorporates the principles of this invention. It is understood that the cabinet size can vary in size and the number of compartments and cubbies may vary and still incorporate the principles of this invention.

Cabinet 10 comprises a pair of vertical side walls 12 and 14, and three horizontal walls 16, 18, and 22 dividing cabinet 10 into upper and lower compartments. While only two compartments are shown, it is understood that as many compartments as desired may be provided. Each of the two compartments is further divided into a plurality of cubbies for storing and displaying individual pair of shoes and/or other articles, such as socks or stockings, in the manner illustrated in the figure. The cubbies are open in the front and may be closed off with a rear panel (not shown) or left open as desired.

The cubbies are formed by a plurality of horizontal and identical vertical dividers 24 and 26, respectively, which are interleaved in the manner now to be described.

Figure 3:
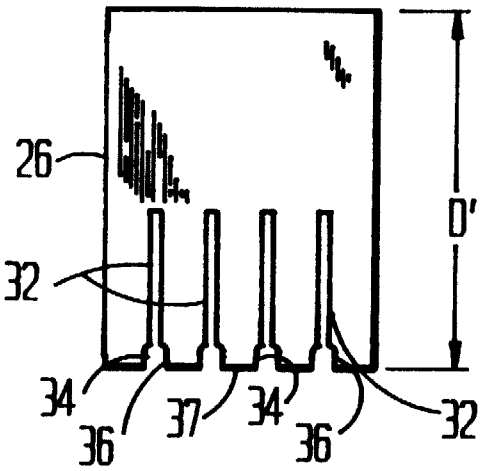
FIG. 3 is a side plan view of a vertical divider with the slits in the front.
Figure 2:
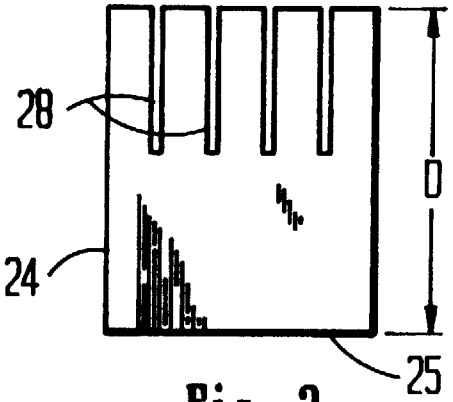
FIG. 2 is a plan view of a horizontal divider with the slits in the rear.
Figure 6:
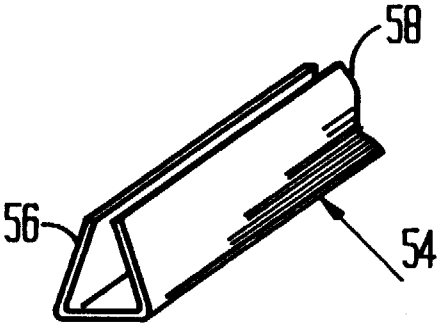
FIG. 6 is an isometric view of a typical front edge moulding or channel.
Figure 4:
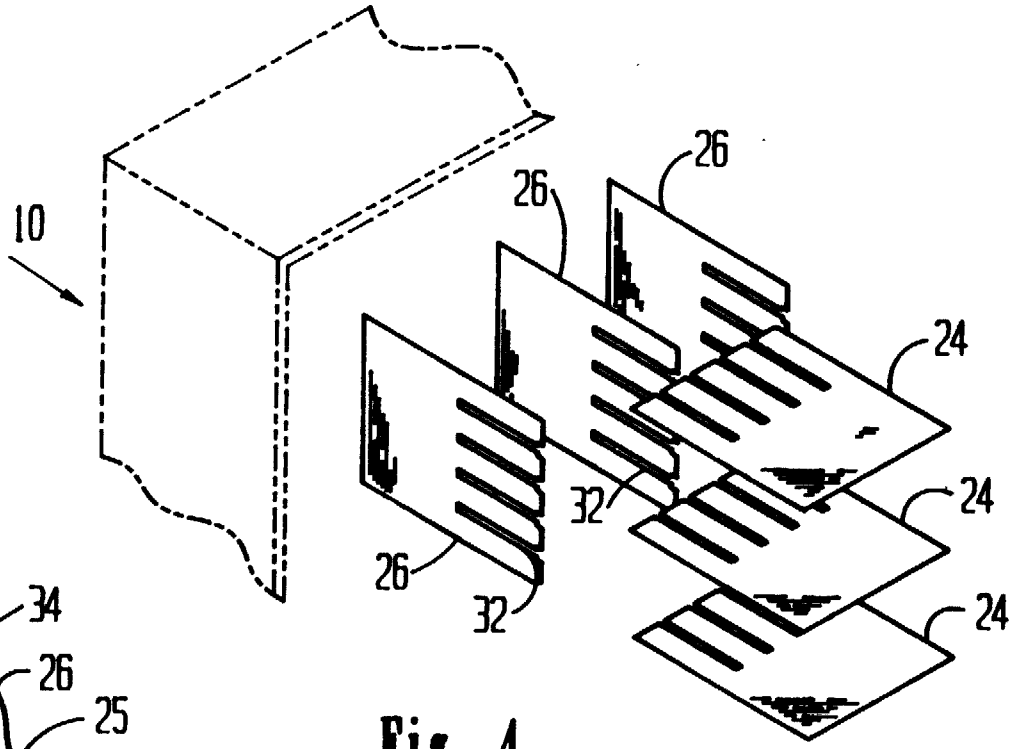
FIG. 4 is an exploded view partially schematized of a compartment shown in the embodiment of FIG. 1.

Referring to FIGS. 2, 3, and 4, horizontal divider 24 is a flat sheet of suitable material such as a rigid plastic with a front edge 25 and slits 28 extending part of the way from the rear to about the mid point of the depth of divider 24, each slit having an opening width large enough to accommodate the thickness of a vertical divider 26 as will be seen below.

Vertical divider 26 is also a flat sheet of rigid material typically plastic with slits 32 extending part of the way back from the front edge of the latter. The width of the openings formed by slits 32 is sufficiently large enough to accommodate the thickness of a horizontal divider 24. Slits 32 are provided with recesses or enlarged cutouts 34 and 36 at the front edge of divider 26 for a purpose to be described. The depth D of horizontal divider 24 is less than the depth D of vertical divider 26 so that when assembled the forward edges 37 of vertical divider 26 extend beyond the forward edge 25 of horizontal divider 24.

Figure 7:
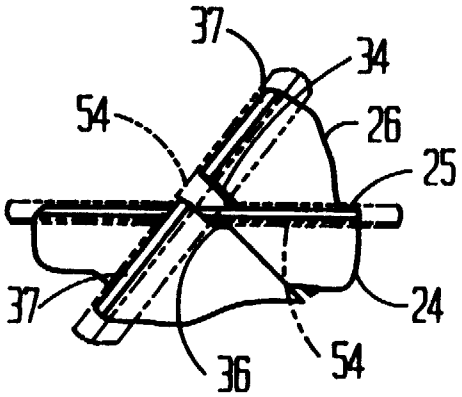
FIG. 7 is an isometric view of a detail showing how the vertical and horizontal dividers interleave.

As best seen in FIG. 4 horizontal and vertical dividers 24 and 26 are interleaved by first inserting the vertical dividers 26 inside the compartment of cabinet 10 with slots 32 projecting to the front of the cabinet and then horizontal dividers 24 are inserted with slots 28 facing the rear of the cabinet so that the dividers are meshed together in the manner illustrated with edges 37 of vertical dividers 26 projecting forward of edge 25 of horizontal divider 24, as seen in FIG. 7 which will be further described below.

Figure 5:
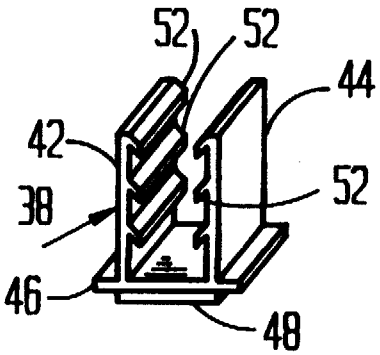
FIG. 5 is an isometric view of a typical holder for use in preventing side to side movement of the front edge of a vertical divider.

In order to help prevent the segments of the vertical dividers 26 between slits 32 which terminate at the front of cabinet 10 from twisting to the left or the right, holders 38 shown in FIG. 5 are employed. Each holder 38 is U-shaped with a pair of legs 42 and 44, and a base 46 with a peel and stick surface 48 on the bottom thereof. Holders 38 are mounted as seen in FIG. 1 on the top and bottom surfaces of horizontal walls 16, 18, and 22 set back from the front of cabinet 10 with legs 42 and 44 extending up when mounted on a top surface and extending down when mounted on a bottom surface, each leg being provided with projections 52 to grasp the surface of a vertical divider 26. The purpose of recesses 34 and 36 is to accommodate channels 54 which will be described below.

To improve the appearance of the front exposed edges of the horizontal and vertical dividers 24 and 26, and to eliminate any sharp edges, as well as to help keep the segments of each vertical divider 26 between slits 32 in place channels 54 may be snapped on to both the horizontal and vertical edges. Channels 54 are also U-shaped except that the legs 54 and 58 are biased inwardly in the manner shown so that once snapped on they will stay in place. Holders 38 and channels 54 may be constructed of a suitable plastic material.

As seen in FIG. 7, the forward edges 37 of each vertical divider 26 extend beyond the forward edge of horizontal dividers 24. Thus channel placed on edge 25 is overlapped by channel 54 mounted on the forward edges 37 of each vertical divider 26 bridging slits 32. When assembling cabinet 10, vertical dividers 24 are inserted first followed by horizontal dividers 24. Channels 54 must be placed on horizontal dividers 24 before channels 54 can be placed on the vertical dividers. Recesses or cutouts 34 and 36 in vertical dividers 26 accommodate the channels 54 which are placed on horizontal dividers 24.

It is thus seen that has been provided a unique cabinet for the convenient storage of shoes and the like which makes highly efficient use of limited space, is economic in construction, and is easy to assemble and use.

While only certain preferred embodiments of this invention have been described it is understood that many variations are possible without departing from the principles of this invention as defined in the claims which follow.

What is claimed is:

1. A cabinet for the storage of shoes and the like comprising a pair of spaced, vertically extending end walls and a pair of spaced, horizontally extending upper and lower end walls defining an enclosure having front and rear openings, a plurality of spaced, vertical dividers parallel to said vertical end walls extending between said horizontal end walls, said vertical dividers being slit at spaced intervals at the front, each slit extending part of the way back from the front of said cabinet, a plurality of spaced, horizontal dividers parallel to said horizontally extending end wall and extending between said vertical extending end walls, said horizontal dividers being slit at spaced intervals at the rear of said cabinet, each slit extending part of the way from the back of said cabinet, said vertical and horizontal dividers being interleaved with each other so that the slits in said horizontal dividers accommodate said vertical dividers and the slits in said vertical dividers accommodate said horizontal dividers forming vertical columns and horizontal rows of cubby holes for said shoes with the forward edges of said vertical dividers located forward of the front edges of said horizontal dividers, and prevention means to prevent side movement of the front edges of said vertical dividers, said preventing means including holding means mounted on each of said horizontal end walls adjacent the front of said cabinet and channels mounted on the forward edges of said vertical dividers forward of the front edges of said horizontal dividers and channels mounted on the front edges of said horizontal dividers, the forward edges of said vertical dividers adjacent said slits being recessed to accommodate said channels.

2. The cabinet of claim 1 in which each said holding means comprises a U-shaped member having legs extending vertically for engaging a vertical divider therebetween.

3. The cabinet of claim 2 in which each of said legs is provided with projections to increase the effectiveness of engaging the vertical divider therebetween.

4. The cabinet of claim 3 wherein said U-shaped member has a base wall with a peel and stick surface on the bottom thereof.

5. The cabinet of claim 1 wherein the depth of the horizontal dividers is less than the depth of the vertical dividers so that when assembled the forward edges of the vertical dividers extend beyond the front edge of the horizontal dividers.

6. The cabinet of claim 1 wherein said channels are U-shaped and have inwardly biased legs so that the same may be snapped onto the edges of the vertical and horizontal dividers.

*7. A cabinet for the storage of shoes and the like comprising a pair of spaced, vertically extending end walls and a pair of spaced, horizontally extending upper and lower end walls defining an enclosure having a front and rear, a plurality of spaced, vertical dividers parallel to said vertical end walls extending between said horizontal end walls, said vertical dividers being slit at spaced intervals at the front, each slit extending part of the way back from the front of said enclosure, a plurality of spaced, horizontal dividers parallel to said horizontally extending end walls and extending between said vertical extending end walls, said horizontal dividers being slit at spaced intervals at the rear of said enclosure, each slit extending part of the way from the rear of said enclosure, said vertical and horizontal*

*dividers being interleaved with each other so that the slits in said horizontal dividers accommodate said vertical dividers and the slits in said vertical dividers accommodate said horizontal dividers forming vertical columns and horizontal rows of cubby holes for said shoes with the forward edges of said vertical dividers located forward of the front edges of said horizontal dividers, and prevention means to prevent side movement of the front edges of said vertical dividers, said preventing means including channels mounted on the forward edges of said vertical dividers forward of the front edges of said horizontal dividers and channels mounted on the front edges of said horizontal dividers, the forward edges of said vertical dividers adjacent said slits being recessed to accommodate said channels.*

*8. A cabinet for the storage of shoes and the like comprising a pair of spaced, vertically extending end walls and a pair of spaced, horizontally extending upper and lower end walls defining an enclosure having a front and rear, at least one spaced, vertical divider parallel to said vertical end walls extending between said horizontal end walls, said vertical divider being slit at spaced intervals at the front, each slit extending part of the way back from the front of said enclosure, a plurality of spaced, horizontal dividers parallel to said horizontally extending end walls and extending between said vertical extending end walls, said horizontal dividers being slit at the rear of said enclosure, said slit extending part of the way from the rear of said enclosure, said vertical and horizontal dividers being interleaved with each other so that the slits in said horizontal dividers accommodate said vertical divider and the slits in said vertical divider accommodate said horizontal dividers forming vertical columns and horizontal rows of cubby holes for said shoes with the forward edges of said vertical divider located forward of the front edges of said horizontal dividers, and prevention means to prevent side movement of the front edges of said vertical divider, said prevention means including channels mounted on the forward edge of said vertical divider forward of the front edges of said horizontal dividers and channels mountede on the frot edges of said horizontal dividers, the forward edge of said vertical divider adjacent said slots being recessed to accommodate said channels.*

* * * * *